United States Patent
Cho et al.

(10) Patent No.: US 7,424,385 B2
(45) Date of Patent: Sep. 9, 2008

(54) PORTABLE TERMINAL HAVING MOTION DETECTION FUNCTION AND MOTION DETECTION METHOD THEREFOR

(75) Inventors: Sung-Jung Cho, Suwon-si (KR); dong-Yoon Kim, Seoul (KR); Won-Chul Bang, Sungnam-si (KR); Eun-Seok Choi, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 296 days.

(21) Appl. No.: 11/318,753

(22) Filed: Dec. 27, 2005

(65) Prior Publication Data

US 2006/0258194 A1    Nov. 16, 2006

(30) Foreign Application Priority Data

May 12, 2005    (KR)    ............ 10-2005-0039910

(51) Int. Cl.
  *G01P 15/00* (2006.01)
(52) U.S. Cl. ....................................... 702/141
(58) Field of Classification Search ............. 702/141, 702/145, 150–154
  See application file for complete search history.

(56) References Cited

U.S. PATENT DOCUMENTS

| 6,201,554 B1 * | 3/2001 | Lands | 345/169 |
|---|---|---|---|
| 2004/0012566 A1 * | 1/2004 | Bradski | 345/158 |
| 2004/0236500 A1 * | 11/2004 | Choi et al. | 701/200 |
| 2006/0060068 A1 * | 3/2006 | Hwang et al. | 84/615 |
| 2006/0255139 A1 * | 11/2006 | Lee et al. | 235/439 |
| 2006/0256082 A1 * | 11/2006 | Cho et al. | 345/156 |
| 2006/0260397 A1 * | 11/2006 | Kim et al. | 73/488 |

FOREIGN PATENT DOCUMENTS

| EP | 825 514 | * | 2/1998 |
| EP | 1 731 995 | * | 12/2006 |
| GB | 2 347 593 | * | 9/2000 |
| JP | 2001-272413 | * | 10/2001 |
| KR | 10-2005-0024032 | | 9/2003 |
| WO | 01/56256 | * | 8/2001 |
| WO | 01/86920 | * | 11/2001 |

* cited by examiner

*Primary Examiner*—Michael P Nghiem
(74) *Attorney, Agent, or Firm*—The Farrell Law Firm, PC

(57) ABSTRACT

A portable terminal having a motion detection function and a motion detection method for the portable terminal are provided. A motion of the portable terminal is input by measuring an acceleration along the X-, Y- and Z-axes of the portable terminal. A current posture of the portable terminal is calculated by calculating rotation angles along the X- and Z-axes with respect to the X- and Z-axes in a basic posture using the acceleration along the X-, Y- and Z-axes. The acceleration along each axis is converted to an equivalent basic-posture acceleration along each axis using the rotation angles. The detected motion of the portable terminal is recognized using the basic-posture acceleration along each axis.

12 Claims, 5 Drawing Sheets

| COLLECTED DB | | BEFORE AXIAL CONVERSION | | AFTER AXIAL CONVERSION | |
|---|---|---|---|---|---|
| Class | # of data | NUMBER OF DETECTED MOTIONS | DETECTION RATE | NUMBER OF DETECTED MOTIONS | DETECTION RATE |
| 0 | 300 | 101 | 33.67 | 287 | 95.67 |
| 1 | 300 | 5 | 1.67 | 294 | 98 |
| 2 | 300 | 134 | 44.67 | 288 | 96 |
| 3 | 229 | 210 | 70.23 | 279 | 93.31 |
| 4 | 300 | 31 | 10.33 | 290 | 96.67 |
| 5 | 300 | 56 | 18.67 | 283 | 94.33 |
| 6 | 229 | 164 | 54.85 | 241 | 80.6 |
| 7 | 300 | 9 | 3 | 292 | 97.33 |
| 8 | 300 | 53 | 17.67 | 294 | 98 |
| 9 | 300 | 0 | 0 | 292 | 97.33 |
| alpha | 300 | 23 | 7.67 | 244 | 81.33 |
| cancel | 300 | 3 | 1 | 296 | 98.67 |
| circlecw | 300 | 189 | 63 | 288 | 96 |
| delete | 300 | 2 | 0.67 | 293 | 97.67 |
| | | | | | |
| Total | 4198 | | | | |
| Correct | | 980 | | 3961 | |
| Average | | | 23.36 | | 94.35 |

FIG.5

PORTABLE TERMINAL HAVING MOTION DETECTION FUNCTION AND MOTION DETECTION METHOD THEREFOR

PRIORITY

This application claims priority under 35 U.S.C. § 119 to an application entitled "Portable Terminal Having Motion Detection Function And Motion Detection Method Therefor" filed in the Korean Intellectual Property Office on May 12, 2005 and assigned Ser. No. 2005-39910, the contents of which are incorporated herein by reference.

BACKGROUND OF THE INVENTION

1. Field of the Invention

The present invention relates generally to a portable terminal having a motion detection function and a motion detection method therefor, and in particular, to a portable terminal having a motion detector for measuring accelerations of the portable terminal along its' X-, Y- and Z-axes, and a controller for calculating rotation angles of the portable terminal along the X- and Z-axes in a current posture of the portable terminal with respect to the X- and Z-axes in a basic posture of the portable terminal using the acceleration measurements, converting the accelerations along each axis to basic-posture accelerations along each axis using the rotation angles, and recognizing the motion of the portable terminal based on the basic-posture accelerations along each axis, and a motion detection method for the portable terminal.

2. Description of the Related Art

In recent years the use of mobile phones and PDAs (Personal Digital Assistants) have increased dramatically. These portable terminals find their use in increasing applications including image capturing with an equipped digital camera, satellite broadcasting reception, and games, beyond basic phone calls or scheduling.

In addition, such portable terminals have been made to include a motion detector so that the motion or inclination of a handset itself can be used as a form of manipulation, instead of pressing a keypad with buttons or touching a touch screen.

Hence, without pressing the digits of a phone number one by one on the keypad, a call can be placed by making a motion with the portable terminal.

For instance, a spam call or a spam message may be deleted by shaking the portable terminal with a motion detector twice up and down. A call may be placed by short dialing using a digit if a user draws the digit with the portable terminal. In addition, the user can play a percussion instrument like a tambourine or can create a variety of beatbox effects by shaking the portable terminal. Particularly, drawing '0' or '1' with the portable terminal can invoke an utterance such as "oh yes" or "oh no" in on-line games or in using emoticons. Furthermore, songs can be selected by means of a simple up and down motion of the portable terminal during use of an MP3 function.

Conventionally, the user makes an intended motion with the portable terminal, while maintaining the portable terminal in a basic posture, for motion detection. This conventional motion detection method neglects the fact that the portable terminal takes a different posture in a three-dimensional space depending on the user's holding the portable terminal in his hand.

The basic posture refers to a posture in which the user is supposed to maintain the portable terminal when making a motion with the portable terminal, for motion detection in the portable terminal.

The above motion detection method neglects other postures of the portable terminal, increases user inconvenience and decreases a motion detection rate.

SUMMARY OF THE INVENTION

An object of the present invention is to substantially solve at least the above problems and/or disadvantages and to provide at least the advantages below. Accordingly, an object of the present invention is to provide a portable terminal for detecting a motion made not only in a predetermined basic posture but in any other input posture, and a motion detection method therefor.

Another object of the present invention is to provide a portable terminal for detecting a motion made not only in a predetermined basic posture but in any other input posture by calculating rotation angles of the portable terminal.

A further object of the present invention is to provide a motion detection method for a portable terminal, in which a motion made not only in a predetermined basic posture but in any other input posture can be detected by calculating rotation angles of the portable terminal.

The above objects are achieved by providing a portable terminal having a motion detection function and a motion detection method therefor.

According to one aspect of the present invention, in a portable terminal having a motion detection function, a motion detector measures an acceleration along each axis of the portable terminal. A controller calculates rotation angles along the X- and Z-axes in a current posture of the portable terminal with respect to the X- and Z-axes in a basic posture using the acceleration along each axis, converts the acceleration along each axis to an equivalent basic-posture acceleration along each axis using the rotation angles, and recognizes a motion of the portable terminal using the basic-posture acceleration along each axis.

According to another aspect of the present invention, in a motion detection method for a portable terminal, a motion of the portable terminal is input by measuring an acceleration along each axis of the portable terminal. A current posture of the portable terminal is calculated by calculating rotation angles along the X- and Z-axes with respect to the X- and Z-axes in a basic posture using the acceleration along each axis. The acceleration along each axis is converted to an equivalent basic-posture acceleration along each axis using the rotation angles. The motion of the portable terminal is recognized using the basic-posture acceleration along each axis.

BRIEF DESCRIPTION OF THE DRAWINGS

The above and other objects, features and advantages of the present invention will become more apparent from the following detailed description when taken in conjunction with the accompanying drawings in which:

FIG. 5 is a list comparing posture conversion to the basic posture with non-posture conversion to the basic posture according to the embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, three axes are mutually orthogonal X-, Y- and Z-axes and three-axis accelerations refer to accelerations along the respective three axes.

Figure 1:
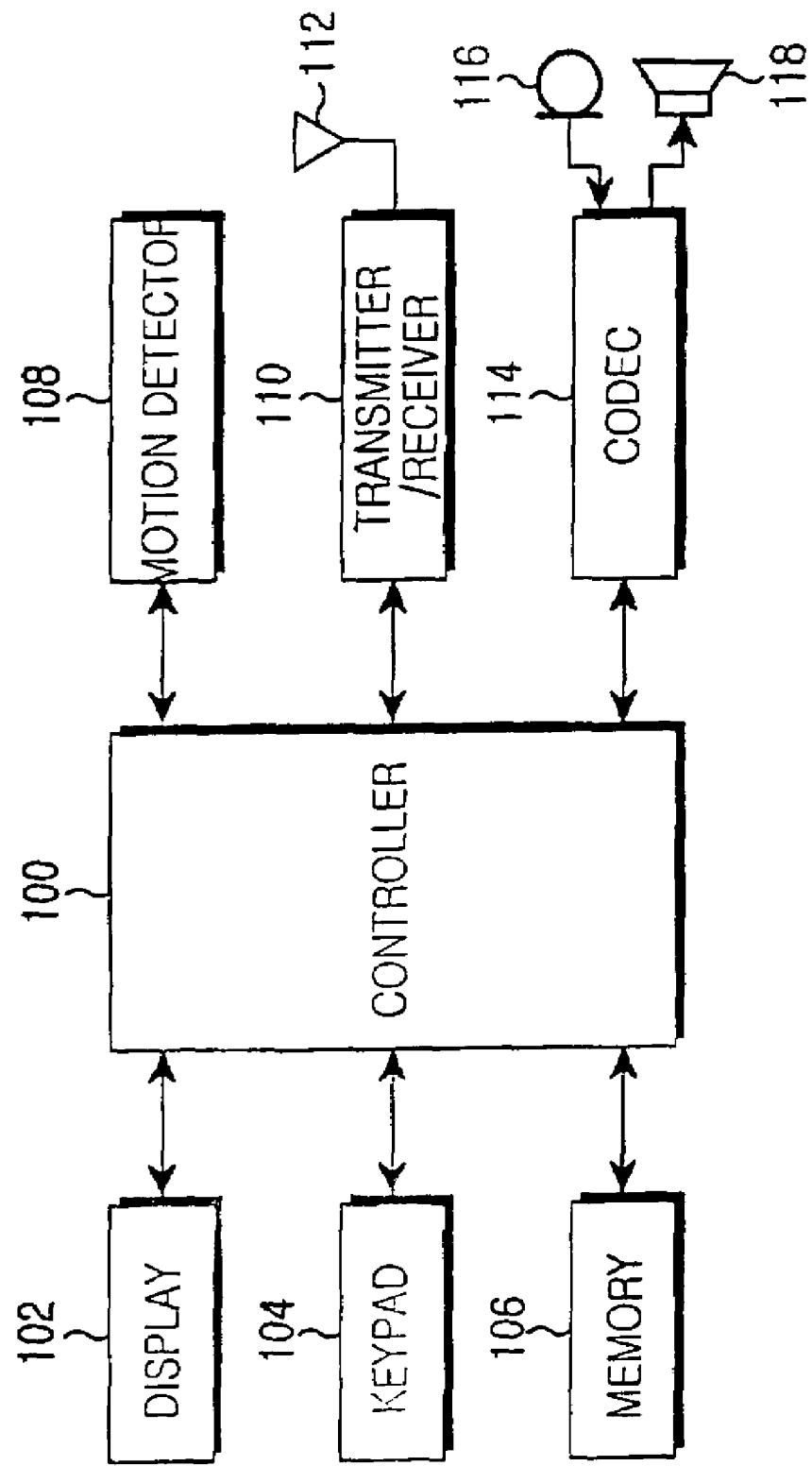
FIG. 1 is a block diagram of a portable terminal capable of improved motion input according to an embodiment of the present invention.

FIG. 1 is a block diagram of a portable terminal capable of improved motion input according to an embodiment of the present invention.

Referring to FIG. 1, the portable terminal includes a controller 100, a display 102, a keypad 104, a memory 106, a motion detector 108, a transmitter/receiver 110, an antenna 112, a CODEC (Coder-Decoder) 114, a microphone 116, and a speaker 118.

The controller 100 provides overall control to the operations of the portable terminal. For example, the controller 100 processes and controls voice call and data communication. In addition to its typical functionality, the controller 100 converts a motion in an arbitrary posture of the portable terminal to that in a basic posture in a motion detection using the motion detector 108 according to the present invention.

Also, the controller 100 calculates rotation angles along the X- and Z-axes in a current posture of the portable terminal with respect to the X- and Z-axes in a basic posture of the portable terminal using the acceleration along the X-, Y- and Z-axes when the acceleration is lower than a threshold acceleration just after the motion key is pressed. It converts the accelerations along the X-, Y- and Z-axes measured between the time the accelerations are higher than the threshold acceleration and a motion completion time to equivalent basic-posture accelerations along the X-, Y- and Z-axes using the rotation angles. And it recognizes a motion of the portable terminal by identifying a corresponding motion in the motion database having accelerations which correspond to the basic-posture accelerations along the X-, Y- and Z-axes.

The controller 100 calculates the rotation angles along the X- and Z-axes in the current posture of the portable terminal by $$Z\text{-axis rotation angle}(\varphi): \varphi = \tan^{-}\left(\frac{\overline{A}_x}{\overline{A}_y}\right) \quad (1)$$

-continued $$X\text{-axis rotation angle}(\phi): \phi = \tan^{-}\left(\frac{\overline{A}_z}{\overline{A}_y}\right)$$

where $\overline{A}_x$, $\overline{A}_y$ and $\overline{A}_z$ are averages of accelerations $A_x$, $A_y$ and $A_z$ along the X-, Y- and Z-axes, respectively when the accelerations are lower than a threshold acceleration.

The controller 100 converts the acceleration along the X-, Y- and Z-axes to an equivalent basic-posture acceleration along the X-, Y- and Z-axes by conversion for Z axis: (2)

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for X axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\phi$ is the rotation angle along the Z-axis, $\phi$ is the rotation angle along the X-axis, $A_x$, $A_y$ and $A_z$ are the accelerations along the X-, Y- and Z-axes and $A_{x1}$, $A_{y1}$ and $A_{z1}$ are basic-posture accelerations along the X-, Y- and Z-axes.

A description of the typical processing and control operation of the controller 100 will not be provided herein.

The display 102 displays status information (or indicators) generated during the operations of the portable terminal, limited digits and characters, moving pictures, still images, etc. A color LCD (Liquid Crystal Display) can be used as the display 102.

The keypad 104 includes digit keys 0 through 9 and function keys such as a Menu key, a Cancel (Clear) key, an OK key, a Talk key, an End key, an Internet key, and navigation keys ◀▶.

In addition to its typical functions, the keypad 104 further has a motion key designated to indicate the start and end of a motion of the portable terminal and provides key input data corresponding to a key pressed by a user to the controller 100. The motion key starts a motion recognition of the portable terminal.

The memory 106 stores programs for controlling the overall operations of the portable terminal, temporarily stores data generated during the operations of the portable terminal, and stores data to be kept (e.g. phone numbers, SMS messages, image data, etc.). According to the present invention, the memory 106 stores a motion database having motion information in relation to motions of the portable terminal. The motion database stores information of motions having corresponding accelerations which correspond to the basic-posture accelerations along the X-, Y- and Z-axes.

The motion detector 108 measures the motion status of the portable terminal. Preferably, motion detector 108 is a type of acceleration measurer that measures accelerations along the three X-, Y- and Z-axes and senses the inclination and motion of the portable terminal based on a change in accelerations.

The transmitter/receiver 110 downconverts an RF (Radio Frequency) signal received through the antenna 112 and despreads and channel-decodes the downconverted signal during reception. For transmission, the transmitter/receiver 110 channel-encodes and spreads transmission data, upconverts the spread signal to an RF signal, and transmits the RF signal through the antenna 112. It also receives a base station ID (Identifier) on a pilot channel.

The CODEC 114 connected to the controller 100, and the microphone 116 and the speaker 118 connected to the CODEC 114, collectively form a voice input/output block for a voice call. The CODEC 114 converts PCM (Pulse Code Modulation) data received from the controller 100 to an analog voice signal and outputs the voice signal through the speaker 118. It also converts a voice signal received from the microphone 116 to PCM data and provides the PCM data to the controller 100.

A motion detection method for the portable terminal described above according to the present invention will be described with reference to FIG. 2.

Figure 2:
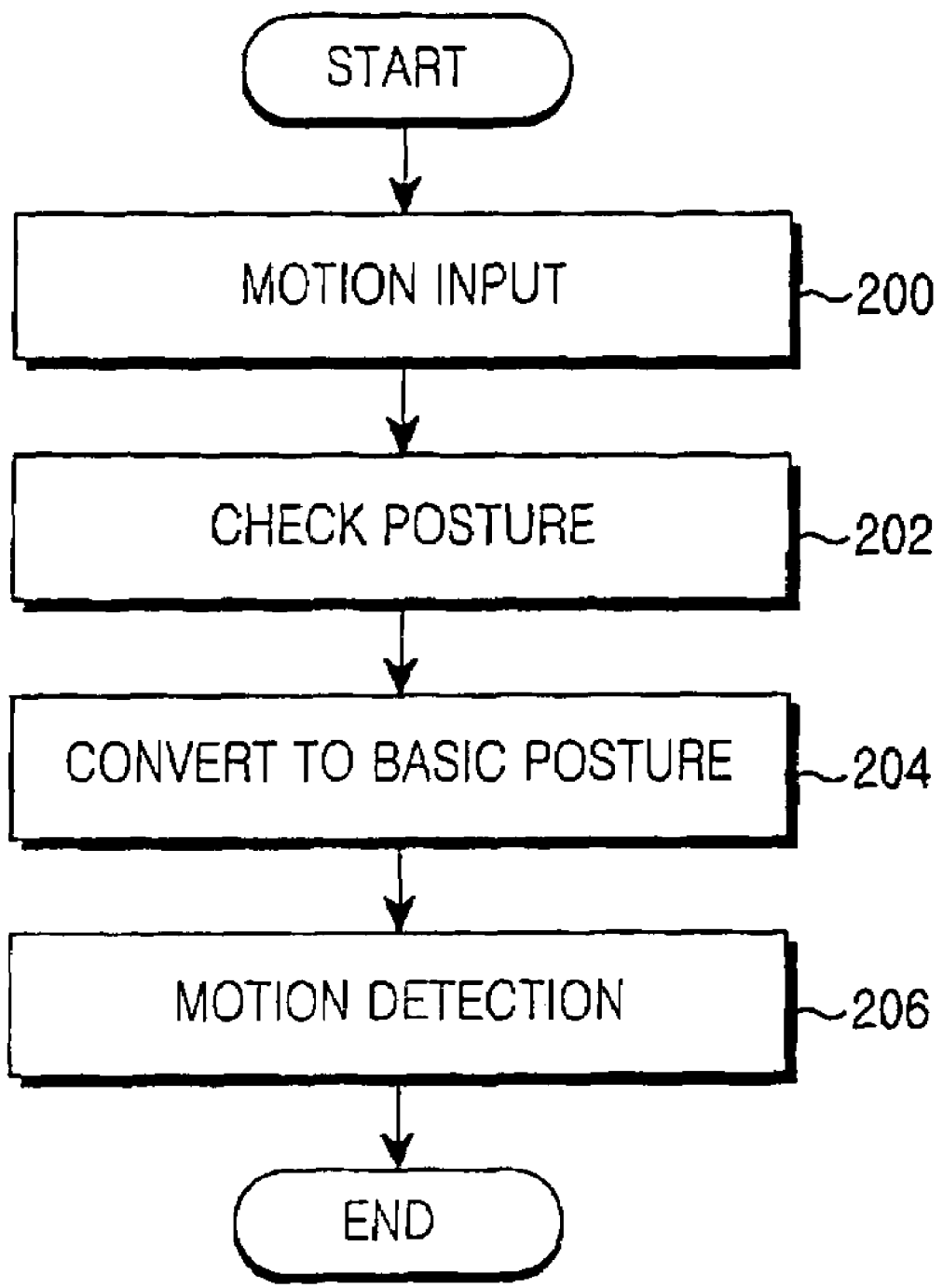
FIG. 2 is a flowchart illustrating an operation for detecting a motion that the portable terminal makes in an arbitrary posture according to the embodiment of the present invention.

FIG. 2 is a flowchart illustrating an operation for detecting a motion that the portable terminal makes in an arbitrary posture according to the embodiment of the present invention.

Referring to FIG. 2, the user makes a motion with the portable terminal in step 200 with enacting a motion key to recognize a motion start. In step 202, the portable terminal (the controller 100) compares a basic posture with an input posture of the portable terminal and calculates the rotation status of the portable terminal in the input posture. Or it calculates rotation angles along the X- and Z-axes in a current posture of the portable terminal with respect to the X-and Z-axes in a basic posture of the portable terminal using the acceleration along the X-, Y- and Z-axes when the acceleration is lower than a threshold acceleration just after the motion key is enacted. The calculation is performed using the following Equation (3). This will be described with reference to FIGS. 3A and 3B.

Figure 3B:
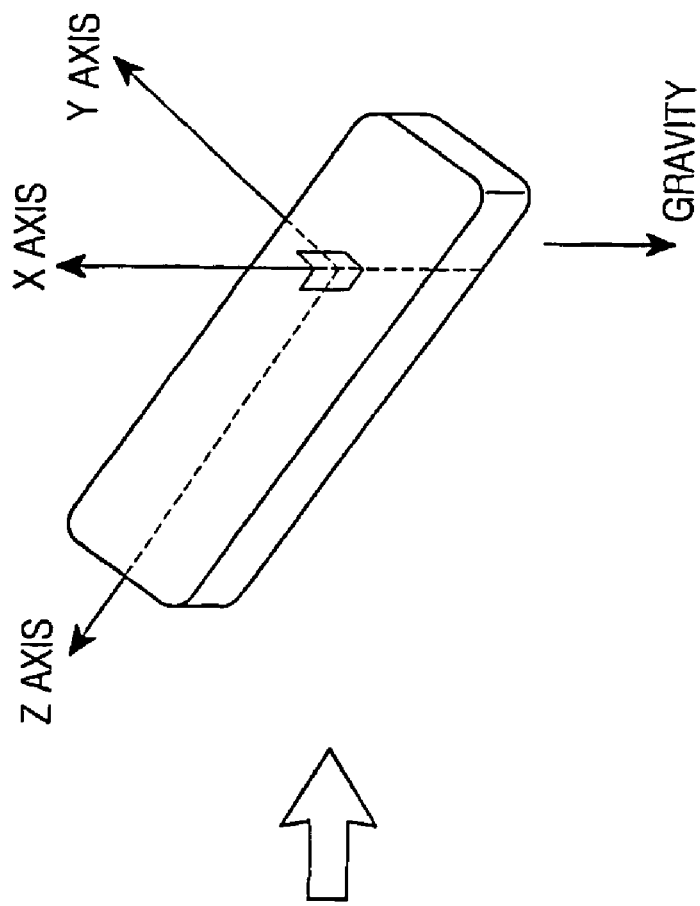
FIG. 3B illustrates axial directions in the state where the portable terminal is rotated at −90° with respect to a Z-axis in the basic posture according to the embodiment of the present invention.
Figure 3A:
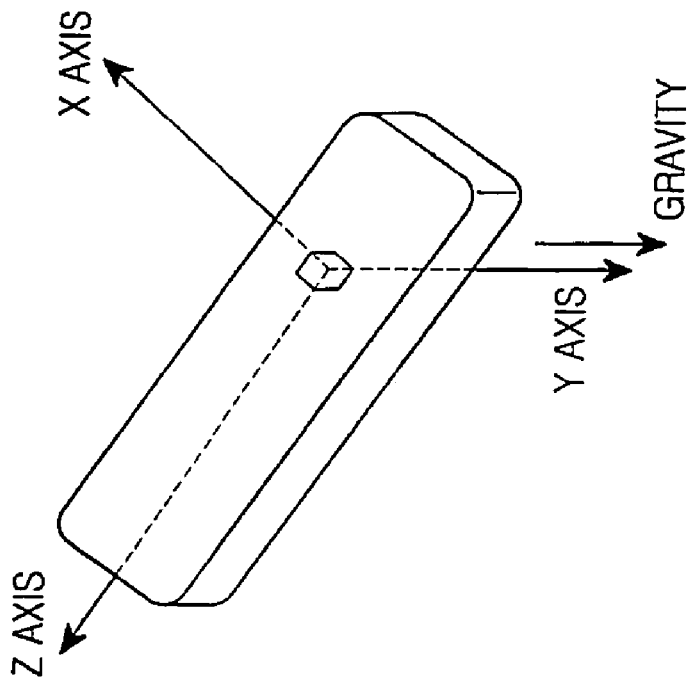
FIG. 3A illustrates axes in a basic posture of the portable terminal, along which accelerations of the portable terminal are measured according to the embodiment of the present invention.

FIG. 3A illustrates axes in a basic posture of the portable terminal, along which accelerations of the portable terminal are measured according to the embodiment of the present invention, and FIG. 3B illustrates axial directions in the state where the portable terminal is rotated at −90° with respect to the Z-axis in the basic posture according to the embodiment of the present invention.

$$\text{Z-axis rotation angle}(\varphi): \varphi = \tan^{-1}\left(\frac{\overline{A}_x}{\overline{A}_y}\right) \tag{3}$$

$$\text{X-axis rotation angle}(\phi): \phi = \tan^{-1}\left(\frac{\overline{A}_z}{\overline{A}_y}\right)$$

where $\overline{A}_x$, $\overline{A}_y$, and $\overline{A}_z$ are the averages of accelerations $A_x$, $A_y$ and $A_z$ along the X-, Y- and Z-axes, respectively. The Y-axis coincides with a gravity direction and rotation along the Y-axis leads to no change in the accelerations of the other axes. Therefore, the Y-axis rotation is meaningless.

After measuring the rotation status of the portable terminal (the controller 100) in step 202, the three-axis accelerations in the rotation status are converted to three-axis basic-posture accelerations in step 204 by Equation (4). Or converting the accelerations along the X-, Y- and Z-axes measured between the time the accelerations are higher than the threshold acceleration and a motion completion time to equivalent basic-posture accelerations along the X-, Y- and Z-axes using the rotation angles is performed.

In the present invention, the three-axis basic-posture accelerations refer to accelerations along the three axes in an arbitrary posture converted to equivalent three-axis accelerations in the basic posture by Equation (4).

conversion for Z axis: (4)

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for X axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\varphi$ is the rotation angle along the Z-axis, $\phi$ is the rotation angle along the X-axis, $A_x$, $A_y$ and $A_z$ are the accelerations along the X-, Y- and Z-axes, and $A_{x1}$, $A_{y1}$ and $A_{z1}$ are basic-posture accelerations along the X-, Y- and Z-axes.

In step 206, a motion is detected and recognized from the motion data-base according to the three-axis basic-posture accelerations. Or recognizing a motion of the portable terminal by identifying a corresponding motion in the motion database having accelerations which correspond to the basic-posture accelerations along the X-, Y- and Z-axes is performed.

Figure 4A:
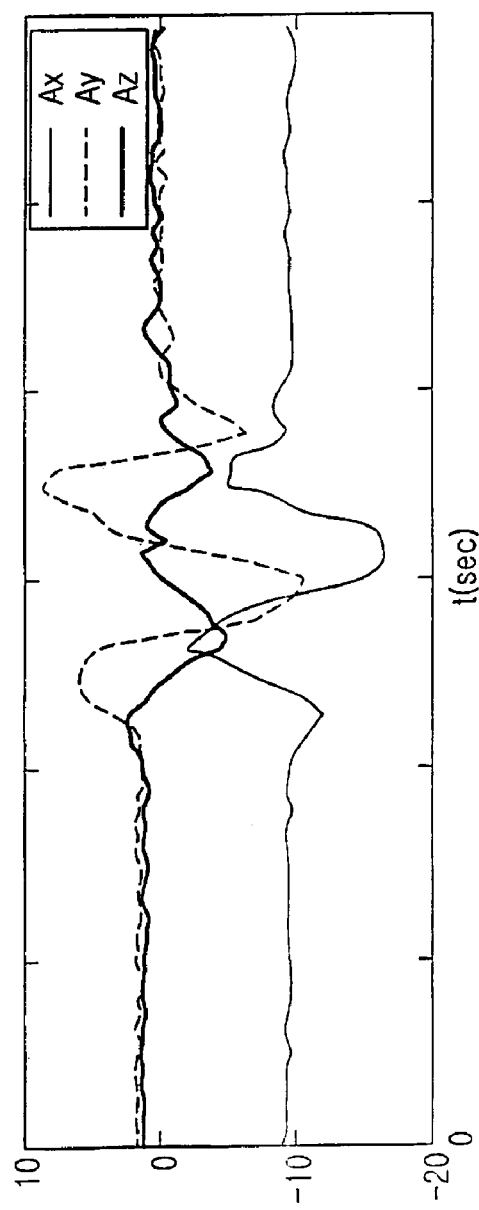
FIG. 4A is a graph illustrating accelerations measured along three axes in the state where the portable terminal is rotated at −90° with respect to the Z-axis according to the embodiment of the present invention.
Figure 4B:
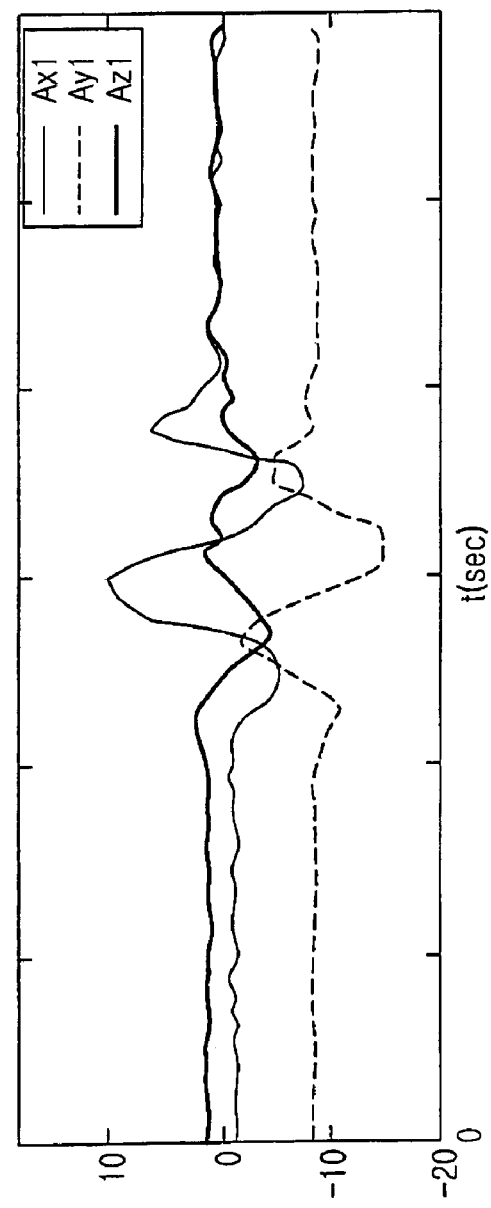
FIG. 4B is a graph illustrating three-axis accelerations in the basic posture converted from the three-axis accelerations measured in the state where the portable terminal is rotated at −90° with respect to the Z-axis according to the embodiment of the present invention.

FIG. 4A is a graph illustrating accelerations measured along the three axes in the state where the portable terminal is rotated at −90° with respect to the Z-axis, and FIG. 4B is a graph illustrating equivalent three-axis basic-posture accelerations converted from the three-axis accelerations measured in the state where the portable terminal is rotated at −90° with respect to the Z-axis.

That is, the graph shown in FIG. 4A illustrates three-axis accelerations for a specific motion made in the state illustrated in FIG. 3B and the graph shown in FIG. 4B illustrates three-axis accelerations in the basic posture equivalent to the acceleration measurements of FIG. 4A, i.e. the three-axis accelerations for the specific motion made in the state illustrated in FIG. 3A.

FIG. 5 is a list comparing posture conversion to the basic posture with non-posture conversion to the basic posture according to the embodiment of the present invention. The table lists the results of 299 or 300 tests (number of data in collected DB) for 14 motion classes in the state where the portable terminal is rotated −90° along the Z-axis. A motion detection rate is different depending on whether the present invention is applied or not. An average motion detection rate is only 23.36% before applying the present invention, but it is 94.35% after applying the present invention. This is about a 71% increase.

The posture conversion can be carried out for any posture resulting in rotating the portable terminal at a specific angle along the X- and Z-axes in the basic posture of FIG. 3A as well as for a posture resulting in rotating the portable terminal at −90° along the Z-axis as illustrated in FIG. 3B, that is, for a posture resulting in rotating the portable terminal along only one axis.

As described above, the present invention provides a portable terminal capable of motion detection and a motion detection method for the portable terminal. In the portable terminal, a motion detector measures the three-axis accelerations of the portable terminal, and a controller calculates the rotation angle along the X- and Z-axes in a current posture of the portable terminal with respect to the X- and Z-axes in a basic posture, converts the three-axis acceleration measurements to equivalent three-axis basic-posture accelerations using the rotation angles, and recognizes the motion of the portable terminal using the three-axis basic-posture accelerations. Thus, a motion detection rate is increased and user convenience is improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal having a motion detection function, comprising:
a motion detector for measuring an acceleration along an X-, Y- and Z-axis of the portable terminal; and
a controller for calculating rotation angles along the X- and Z-axes in a current posture of the portable terminal with respect to the X- and Z-axes in a basic posture of the portable terminal using the acceleration along the X-, Y- and Z-axes, converting the acceleration along the X-, Y- and Z-axes measured between the time the acceleration is higher that a threshold acceleration and a motion completion time to an equivalent basic-posture acceleration along the X-, Y- and Z-axes using the rotation angles, and recognizing a motion of the portable terminal using the basic-posture acceleration along the X-, Y- and Z-axes.

2. The portable terminal of claim 1, wherein the controller calculates the rotation angles along the X- and Z-axes in the current posture of the portable terminal by $$Z\text{-axis rotation angle } (\varphi): (\varphi) = \tan^{-}\left(\frac{\overline{A_x}}{\overline{A_y}}\right)$$

$$X\text{-axis rotation angle } (\phi): \phi = \tan^{-}\left(\frac{\overline{A_z}}{\overline{A_y}}\right)$$

where $\overline{A}_x$, $\overline{A}_y$, and $\overline{A}_z$ are averages of accelerations $A_x$, $A_y$ and $A_z$ along the X-, Y- and Z-axes, respectively.

3. The portable terminal of claim 1, wherein the controller converts the acceleration along the X-, Y- and Z-axes to an equivalent basic-posture acceleration along the X-, Y- and Z-axes by conversion for Z axis:

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for X axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\phi$ is the rotation angle along the Z-axis, $\phi$ is the rotation angle along the X-axis, $A_x$, $A_y$ and $A_z$ are the accelerations along the X-, Y- and Z-axes and $A_{x1}$, $A_{y1}$ and $A_{z1}$ are basic-posture accelerations along the X-, Y- and Z-axes.

4. A motion detection method for a portable terminal, comprising the steps of:
inputting a motion of the portable terminal by measuring an acceleration along an X-, Y- and Z-axis of the portable terminal;
calculating a current posture of the portable terminal by calculating rotation angles along the X- and Z-axes with respect to the X- and Z-axes in a basic posture of the portable terminal using the acceleration along the X-, Y- and Z-axes;
converting the acceleration along the X-, Y- and Z-axes measured between the time the acceleration is higher than a threshold acceleration and a motion completion time to an equivalent basic-posture acceleration along the X-, Y- and Z-axes using the rotation angles; and
recognizing a detected motion of the portable terminal using the basic-posture acceleration along the X-, Y- and Z-axes.

5. The motion detection method of claim 4, wherein the posture calculation step comprises a step of calculating the rotation angle along the X- and Z-axes by $$Z\text{-axis rotation angle } (\varphi): (\varphi) = \tan^{-}\left(\frac{\overline{A_x}}{\overline{A_y}}\right)$$

$$X\text{-axis rotation angle } (\phi): \phi = \tan^{-}\left(\frac{\overline{A_z}}{\overline{A_y}}\right)$$

where $\overline{A}_x$, $\overline{A}_y$, and $\overline{A}_z$ are averages of accelerations $A_x$, $A_y$ and $A_z$ along the X-, Y- and Z-axes, respectively.

6. The motion detection method of claim 4, wherein the conversion step comprises a step of converting the acceleration along the X-, Y- and Z-axes to an equivalent basic-posture acceleration along the X-, Y- and Z-axes by conversion for Z axis:

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for X axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\phi$ is the rotation angle along the Z-axis, $\phi$ is the rotation angle along the X-axis, $A_x$, $A_y$ and $A_z$ are the accelerations along the X-, Y- and Z-axes and $A_{x1}$, $A_{y1}$ and $A_{z1}$ are the basic-posture accelerations along the X-, Y- and Z-axes.

7. A portable terminal having a motion detection function, comprising:
a motion detector for measuring an acceleration along an X-, Y- and Z-axis of the portable terminal;
a motion key for starting a motion recognition of the portable terminal;
a motion database for storing information of motions; and
a controller for calculating rotation angles along the X- and Z-axes in a current posture of the portable terminal with respect to the X- and Z-axes in a basic posture of the portable terminal using the acceleration along the X-, Y- and Z-axes when the acceleration is lower than a threshold acceleration just after the motion key is pressed, converting the accelerations along the X-, Y- and Z-axes measured between the time the accelerations are higher than the threshold acceleration and a motion completion time to equivalent basic-posture accelerations along the X-, Y- and Z-axes using the rotation angles, and recognizing a motion of the portable terminal by identifying a corresponding motion in the motion database having accelerations which correspond to the basic-posture accelerations along the X-, Y- and Z-axes.

8. The portable terminal of claim 7, wherein the controller calculates the rotation angles along the X- and Z-axes in the current posture of the portable terminal by $$Z\text{-axis rotation angle } (\varphi)\text{: } (\varphi) = \tan^{-}\left(\frac{\overline{A}_x}{\overline{A}_y}\right)$$

$$X\text{-axis rotation angle } (\phi)\text{: } \phi = \tan^{-}\left(\frac{\overline{A}_z}{\overline{A}_y}\right)$$

where $\overline{A}_x$, $\overline{A}_y$, and $\overline{A}_z$ are averages of accelerations $A_x$, $A_y$, and $A_z$ along the X-, Y- and Z-axes, respectively when the accelerations are lower than a threshold acceleration.

9. The portable terminal of claim 7, wherein the controller converts the acceleration along the X-, Y- and Z-axes to an equivalent basic-posture acceleration along the X-, Y- and Z-axes by conversion for $Z$ axis:

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for $X$ axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\phi$ is the rotation angle along the Z-axis, $\phi$ is the rotation angle along the X-axis, $A_x$, $A_y$ and $A_z$ are the accelerations along the X-, Y- and Z-axes and $A_{x1}$, $A_{y1}$, and $A_{z1}$ are basic-posture accelerations along the X-, Y- and Z-axes.

10. A motion detection method for a portable terminal, comprising the steps of:
enacting a motion key to start a motion recognition of the portable terminal;
calculating rotation angles along the X- and Z-axes in a current posture of the portable terminal with respect to the X- and Z-axes in a basic posture of the portable terminal using the acceleration along the X-, Y- and Z-axes when the acceleration is lower than a threshold acceleration just after the motion key is enacted;
converting the accelerations along the X-, Y- and Z-axes measured between the time the accelerations are higher than the threshold acceleration and a motion completion time to equivalent basic-posture accelerations along the X-, Y- and Z-axes using the rotation angles; and
recognizing a motion of the portable terminal by identifying a corresponding motion in the motion database having accelerations which correspond to the basic-posture accelerations along the X-, Y- and Z-axes.

11. The motion detection method of claim 10, wherein the calculating the rotation angles along the X- and Z-axes in the current posture of the portable terminal is performed by $$Z\text{-axis rotation angle } (\varphi)\text{: } (\varphi) = \tan^{-}\left(\frac{\overline{A}_x}{\overline{A}_y}\right)$$

$$X\text{-axis rotation angle } (\phi)\text{: } \phi = \tan^{-}\left(\frac{\overline{A}_z}{\overline{A}_y}\right)$$

where $\overline{A}_x$, $\overline{A}_y$ and $\overline{A}_z$ are averages of accelerations $A_x$, $A_y$, and $A_z$ along the X-, Y- and Z-axes, respectively.

12. The motion detection method of claim 10, wherein the converting the accelerations along the X-, Y- and Z-axes measured between the time the accelerations are higher than the threshold acceleration and a motion completion time to equivalent basic-posture accelerations along the X-, Y- and Z-axes using the rotation angles is performed by conversion for $Z$ axis:

$$\begin{bmatrix} A_{x1} \\ A_{y1} \\ A_{z1} \end{bmatrix} = \begin{bmatrix} \cos\varphi & -\sin\varphi & 0 \\ \sin\varphi & \cos\varphi & 0 \\ 0 & 0 & 1 \end{bmatrix} \begin{bmatrix} A_x \\ A_y \\ A_z \end{bmatrix}$$

conversion for $X$ axis:

$$\begin{bmatrix} A_{x1} \\ A_{y1} \\ A_{z1} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} A_x \\ A_y \\ A_z \end{bmatrix}$$

where $\phi$ is the rotation angle along the Z-axis, $\phi$ is the rotation angle along the X-axis, $A_x$, $A_y$ and $A_z$ are the accelerations along the X-, Y- and Z-axes and $A_{x1}$, $A_{y1}$ and $A_{z1}$ are the basic-posture accelerations along the X-, Y- and Z-axes.

* * * * *